United States Patent
Noto

(10) Patent No.: US 11,084,582 B2
(45) Date of Patent: Aug. 10, 2021

(54) SYSTEM AND METHOD FOR INTEGRATING FLIGHT PATH AND SITE OPERATING DATA

(71) Applicant: General Electric Company, Schenectady, NY (US)

(72) Inventor: William Borea Noto, Schenectady, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 96 days.

(21) Appl. No.: 16/400,929

(22) Filed: May 1, 2019

(65) Prior Publication Data

US 2019/0256208 A1 Aug. 22, 2019

Related U.S. Application Data

(62) Division of application No. 15/457,410, filed on Mar. 13, 2017, now Pat. No. 10,329,017.

(51) Int. Cl.
*B64C 39/02* (2006.01)
*G05D 1/00* (2006.01)
(Continued)

(52) U.S. Cl.
CPC .......... *B64C 39/024* (2013.01); *G05D 1/0011* (2013.01); *B64C 2201/123* (2013.01); *B64C 2201/127* (2013.01); *B64C 2201/146* (2013.01); *G01C 21/20* (2013.01); *G05D 1/0027* (2013.01); *G05D 2201/0207* (2013.01)

(58) Field of Classification Search
CPC ..... B64C 39/00; B64C 39/02; B64C 2201/00; B64C 2201/12; B64C 2201/123; B64C 2201/127; G08G 5/003; G08G 5/0034; G08G 5/0039; G08G 5/0047; G08G 5/0069; G05D 2201/0207; G21C 17/003;
(Continued)

(56) References Cited

U.S. PATENT DOCUMENTS 9,513,635 B1 12/2016 Bethke et al.
9,536,149 B1 1/2017 Cesarano
(Continued)

FOREIGN PATENT DOCUMENTS

CN 204536215 U 8/2015
CN 205375196 U 7/2016
(Continued)

OTHER PUBLICATIONS

Netland, Oyvind, et al.; "The Capabilities and Effectiveness of Remote Inspection of Wind Turbines", 12th Deep Sea Offshore Wind R&D Conference, EERA DeepWind'2015, vol. 80, pp. 177-184, 2015.
(Continued)

*Primary Examiner* — Thomas G Black
*Assistant Examiner* — Sara J Lewandroski
(74) *Attorney, Agent, or Firm* — Fletcher Yoder, P.C.

(57) ABSTRACT

The present approach relates to the inspection of assets, such as assets having parts that move during operation. As discussed herein, operational data for the asset may be incorporated into planning or adapting the flight plan and/or operational commands may be issued to asset in accordance with the flight plan to facilitate acquisition of the inspection data.

9 Claims, 6 Drawing Sheets

(51) Int. Cl.
*G05D 1/10* (2006.01)
*G01C 21/20* (2006.01)

(58) Field of Classification Search
CPC ........ G21C 17/013; G05B 2219/45066; G06T 7/00; G06T 7/0002; G06T 7/0004
See application file for complete search history.

(56) References Cited

U.S. PATENT DOCUMENTS

| | | | | |
|---|---|---|---|---|
| 9,777,710 | B2* | 10/2017 | Muik | F03D 7/0244 |
| 10,372,142 | B2* | 8/2019 | Venturelli | G05D 1/104 |
| 10,438,494 | B1* | 10/2019 | Hahn | G08G 5/0039 |
| 10,553,122 | B1* | 2/2020 | Gilboa-Amir | G06Q 10/0832 |
| 2007/0159346 | A1* | 7/2007 | Wesselink | F03D 17/00 340/679 |
| 2009/0128402 | A1* | 5/2009 | Altenschulte | F03D 7/047 342/357.4 |
| 2010/0103260 | A1 | 4/2010 | Williams | |
| 2010/0280872 | A1* | 11/2010 | Scholte-Wassink | G06Q 10/06311 705/7.13 |
| 2011/0198854 | A1* | 8/2011 | Minami | F03D 7/047 290/55 |
| 2011/0204631 | A1* | 8/2011 | Minami | H02J 3/381 290/44 |
| 2012/0024053 | A1 | 2/2012 | Cheng | |
| 2012/0136630 | A1 | 5/2012 | Murphy et al. | |
| 2012/0315862 | A1* | 12/2012 | Okano | H04W 8/005 455/73 |
| 2013/0235897 | A1* | 9/2013 | Bouteyre | G01N 25/72 374/4 |
| 2014/0022051 | A1 | 1/2014 | Levien et al. | |
| 2014/0127014 | A1* | 5/2014 | Vilbrandt | F03D 7/047 416/1 |
| 2014/0168420 | A1 | 6/2014 | Naderhirn et al. | |
| 2015/0063202 | A1* | 3/2015 | Mazzarella | H04B 7/18504 370/316 |
| 2016/0017866 | A1* | 1/2016 | Craft | F03D 17/00 348/46 |
| 2016/0070265 | A1 | 3/2016 | Liu et al. | |
| 2016/0140851 | A1 | 5/2016 | Levy et al. | |
| 2016/0217433 | A1 | 7/2016 | Walton et al. | |
| 2016/0292869 | A1 | 10/2016 | Hammond et al. | |
| 2016/0305406 | A1* | 10/2016 | Zell | F03D 17/00 |
| 2016/0378109 | A1 | 12/2016 | Raffa et al. | |
| 2017/0053537 | A1 | 2/2017 | Manley | |
| 2017/0069214 | A1* | 3/2017 | Dupray | G08G 5/0013 |
| 2017/0248948 | A1* | 8/2017 | Otani | B64C 39/024 |
| 2017/0323253 | A1 | 11/2017 | Enssle et al. | |
| 2018/0003161 | A1 | 1/2018 | Michini et al. | |
| 2018/0075649 | A1* | 3/2018 | Godwin | G06T 17/20 |
| 2018/0144644 | A1* | 5/2018 | Heinonen | G01S 19/13 |
| 2018/0259955 | A1* | 9/2018 | Noto | G08G 5/0073 |
| 2019/0026961 | A1 | 1/2019 | Dudar | |
| 2019/0226450 | A1* | 7/2019 | Theopold | F03D 7/0276 |
| 2020/0018291 | A1* | 1/2020 | Rosen | F03D 80/50 |
| 2020/0284242 | A1* | 9/2020 | Caponetti | F03D 17/00 |

FOREIGN PATENT DOCUMENTS

| | | |
|---|---|---|
| DE | 102008053928 A1 | 5/2010 |
| EP | 2527649 B1 | 12/2013 |
| EP | 3115858 A1 | 1/2017 |

OTHER PUBLICATIONS

Schafer, Bjorn E., et al.; "Multicopter unmanned aerial vehicle for automated inspection of wind turbines", Control and Automation (MED), 2016 24th Mediterranean Conference on, Athens, pp. 244-249, Jun. 21-24, 2016.

Orsag, Matko, et al.; "State Estimation, Robust Control and Obstacle Avoidance for Multicopter in Cluttered Environments: EuRoC Experience and Results", 2015 International Conference on Unmanned Aircraft Systems (ICUAS), Jun. 9, 2015, pp. 455-461.

European Search Report; Application No. 18766897.5-1202; dated Dec. 9, 2020; 15 pages.

* cited by examiner

SYSTEM AND METHOD FOR INTEGRATING FLIGHT PATH AND SITE OPERATING DATA

CROSS REFERENCE TO RELATED APPLICATIONS

This application is a divisional of U.S. patent application Ser. No. 15/457,410, entitled "SYSTEM AND METHOD FOR INTEGRATING FLIGHT PATH AND SITE OPERATING DATA," filed Mar. 13, 2017, which is incorporated by reference herein in its entirety for all purposes.

BACKGROUND

The subject matter disclosed herein relates to inspection of an asset, such as a system, device, or facility, using one or more robotic agents such as drones or other unmanned vehicles.

Various entities may own or maintain different types of assets as part of their operation. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a tower, a vehicle, and so forth. Assets may be subject to various types of defects (e.g., spontaneous mechanical defects, electrical defects as well as routine wear-and-tear) that may impact their operation. For example, over time, the asset may undergo corrosion or cracking due to weather or may exhibit deteriorating performance or efficiency due to the wear or failure of component parts.

Typically, one or more human inspectors may inspect, maintain, and repair the asset. For example, the inspector may locate corrosion on the asset, may locate and quantitatively or qualitatively assess cracks or defects on the asset, may assess an asset for the degree of wear-and-tear observed versus what is expected, and so forth. However, depending on the location, size, and/or complexity of the asset, having one or more human inspectors performing inspection of the asset may take away time for the inspectors to perform other tasks or may otherwise be time consuming and labor intensive, requiring personnel time that might be more productively spent elsewhere. Additionally, some inspection tasks may be dull, dirty, or may be otherwise unsuitable for a human to perform. For instance, some assets may have locations that may not be accessible to humans due to height, confined spaces, or the like. Further, inspections may be performed at times that are based on schedules resulting in either over-inspection or under-inspection.

Further, some assets may, due to the nature of their operation, be difficult to inspect or assess while in operation, such as due to moving or inaccessible parts. Thus, an inspection may be either incomplete or may require that the asset be taken offline, and therefore unproductive, during the inspection process. Such outcomes may be undesirable. Further, due to the uncertain nature of the inspection process, i.e., current inspection findings may impact subsequent scheduling, it may be difficult to schedule asset downtime so as to minimize the impact of the inspection process.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In one embodiment, an asset inspection system is provided. In accordance with this embodiment, the asset inspection system includes: an asset controller configured to monitor one or more parameters associated with one or more assets and to control operation of the one or more assets; one or more drones; and a flight controller configured to communicate with the one or more drones and the asset controller and to coordinate operation of the asset with a flight plan followed by the one or more drones during an inspection.

In a further embodiment, a method for initiating a drone-based inspection is provided. In accordance with this method, a command to initiate an inspection is received. One or both of current environmental data or current operational data for one or more assets to be inspected is acquired. An inspection order is calculated based on one or both of the current environmental data or current operational data for the one or more assets and based on location data for the one or more assets. Based on the inspection order, a flight plan is generated for one or more drones. The drones are operated in accordance with the flight plan to inspect the one or more assets.

In an additional embodiment, a method for inspecting an asset is provided. In accordance with this method, a first operational command to adjust operation of an asset is sent as one or more drones approach the asset to perform an inspection. A confirmation is received that the operational command has been performed by the asset. The one or more drones are instructed to execute a flight plan with respect the asset and to collect inspection data when executing the flight plan. Upon completion of the flight plan, A second operational command is sent to return the asset to normal operation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
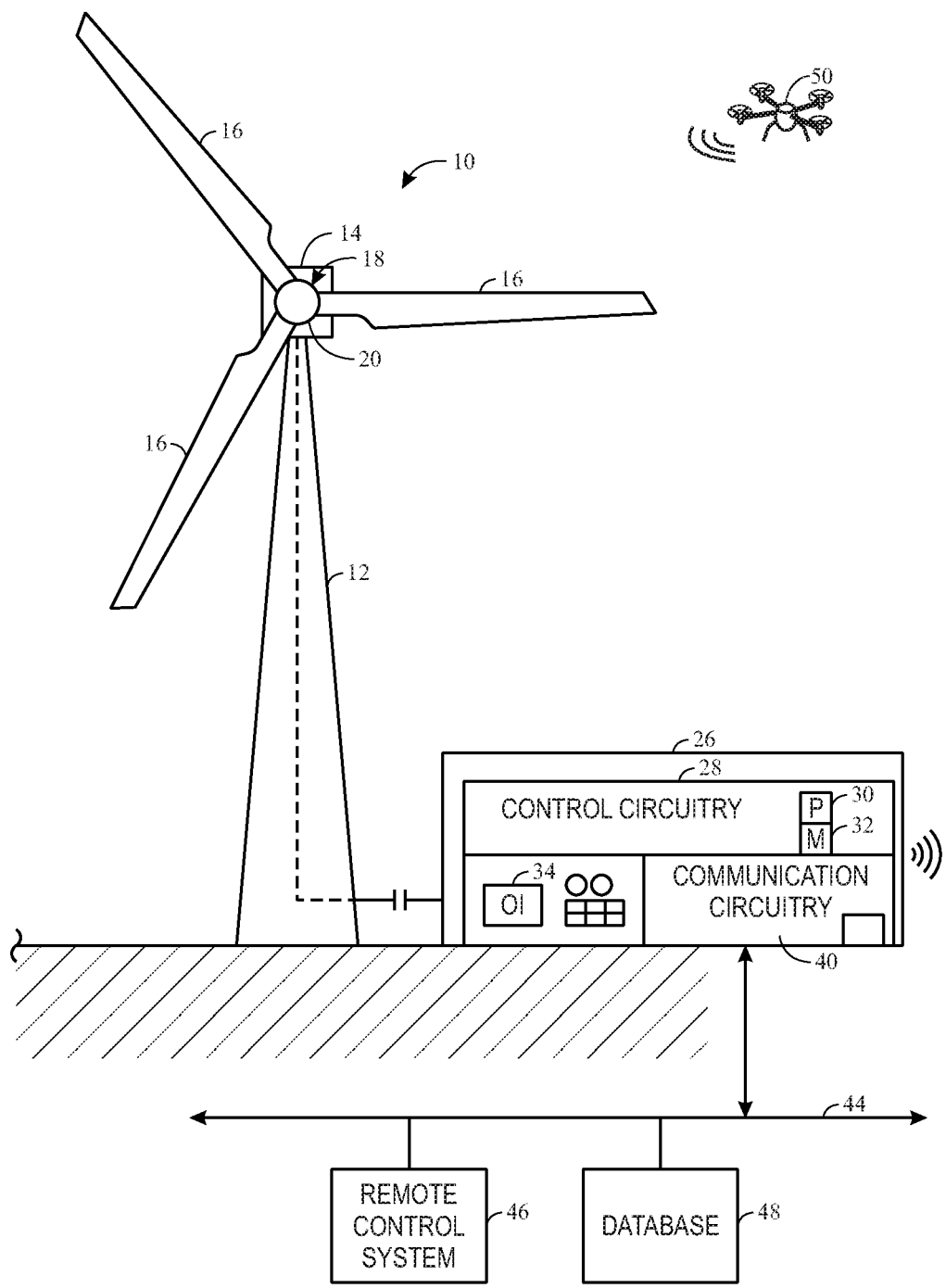
FIG. 1 shows a wind turbine system configured to convert wind energy into electrical energy in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, the present approach relates to the inspection of one or more assets, such as power generation assets, transportation assets, mining or underground pumping assets, manufacture or construction assets and so forth, using unmanned or robotic devices, such as unmanned aerial vehicles (UAVs), unmanned submersible vehicles (USVs), or other autonomously moving vehicles that may be characterized as drones or robots. For simplicity, the term "drone" is used herein, though it should be appreciated that this terminology is intended to encompass all variations, of UAVs, USVs, robotic devices, and so forth that are capable of programmable movement with no or limited human oversight. Such programmable movement can be based on either locally generated path waypoints or guidance or path guidance and waypoints generated by a remote system and communicated to the drone. Thus, as used herein, such devices move during an operational phase or period entirely or primarily without direct human intervention or control and/or with limited human intervention or oversight. In accordance with present approaches, such devices may be operated to move along a flight plan, along which the devices acquire inspection data, such as video or still image data, LIDAR data, or other data that can be acquired by sensors or cameras that can be affixed to a device moving along the flight plan.

Though the phrase "flight plan" is used generally herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects) path or route along which a drone moves as part of an inspection plan. Thus, a "flight plan" as used herein may be characterized as any 1D, 2D, 3D, or 4D route or path along which device such as a drone or robot is moved to perform a sensor-based inspection of an asset. Such a path may be adaptive, as discussed herein, and may consist of one or more waypoints along which the drone proceeds in an ordered fashion, with the sequence and location of waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a drone is with respect to an inspection site but, at a given location or waypoint, the direction the drone is facing or otherwise oriented with respect to.

As discussed herein, the present approach facilitates the inspection of assets that may otherwise be difficult to inspect when operated, such as assets having moving parts which themselves need to be inspected or which generate an environment that would otherwise be hostile to the inspection process. As discussed herein, operational data for the asset may be incorporated into planning or adapting the flight plan and/or operational commands may be issued to asset in accordance with the flight plan to facilitate acquisition of the needed inspection data.

To facilitate explanation and provide useful real-world context, an example of a wind farm having multiple wind turbine generators is discussed herein. It should be appreciated however that such an example is provided merely to facilitate explanation, and the present approach is suitable for use with a wide range of other assets and at various other types of sites. Thus, the present approach is not intended to be limited to the context of the present examples.

With the preceding in mind, and turning to the figures, FIG. 1 depicts a front view of a wind turbine generator 10 configured to convert wind energy into electrical energy. The wind turbine generator 10 includes a tower 12, a nacelle 14 and blades 16. The blades 16 are coupled to a generator 18 within the nacelle 14 by a hub 20 that rotates with the blades 16. The blades 16 are configured to convert the linear air flow from the wind into rotational motion. As the blades 16 rotate, the coupling between the hub 20 and the generator 18 within the nacelle 14 drives components of the generator 18 to rotate, thereby producing electrical energy. While three blades 16 are included in the depicted wind turbine generator 10, alternative implementations may include more or fewer blades 16.

The wind turbine generator 10 may also include a controller 26 to control the operation of the wind turbine generator 10. For example, the controller 26 may control the rotational speed (rpm) of the wind turbine generator 10, the pitch of the blades 16, the yaw of the wind turbine generator 10, as well as other parameters of operation. The controller 26 may include control circuitry 28, which may include a processor 30 and a memory component 32. The processor may be configured to analyze data, run programs, execute instructions, optimize operating parameters of the wind turbine generator 10, and control the operating parameters of the wind turbine generator 10. The memory component 32 may be any non-transitory computer readable medium. The memory component may store data, processor instructions, programs, optimization algorithms, lookup tables, models, and the like, including processor instructions for implementing the present approaches discussed herein. Though depicted as an aspect of the wind turbine generator 10, as discussed below the controller 26 may be implemented at the site level (i.e., a wind farm controller) that monitors and controls operation of a multitude of wind turbine systems 10 at a given site.

In the depicted example, the controller 26 may include or communicate with an operator interface 34. The operator interface 34 may include a display and/or operator inputs. The operator interface 34 allows the wind turbine generator 10 to communicate with and be controlled by the operator and the operator to communicate with the wind turbine generator 10. Though the various components of the controller 26 are shown within a common unit or housing for purposes of illustration, in some embodiments the various components (e.g., control circuitry 28, processor 30, memory 32, operator interface 34, display 36, operator inputs 38, communication circuitry 40, etc.) maybe situated in more than one unit and/or location (i.e., distributed).

The controller 26 may also include communication circuitry 40. In some embodiments, the communication circuitry may facilitate communication between the controller and an operator (e.g. via a smart device) by wired or wireless communication. In some embodiments, the communication circuitry 40 may facilitate communication via a wireless or wired connection. In some embodiments, a remote control system 46 and/or a database 48 (such as a configuration database as discussed below) may be in communication with the controller 26 via a connected network 44. The remote control system 46 may allow commands to be remotely issued to one or more wind turbine systems 10 spread across one or more locations. The network 44 may also provide access to one or more databases 48 containing configuration and/or historical operational data.

In the depicted example a drone 50 is shown as being in the vicinity of the wind turbine generator 10, such as to collect inspection data as discussed herein.

Figure 2:
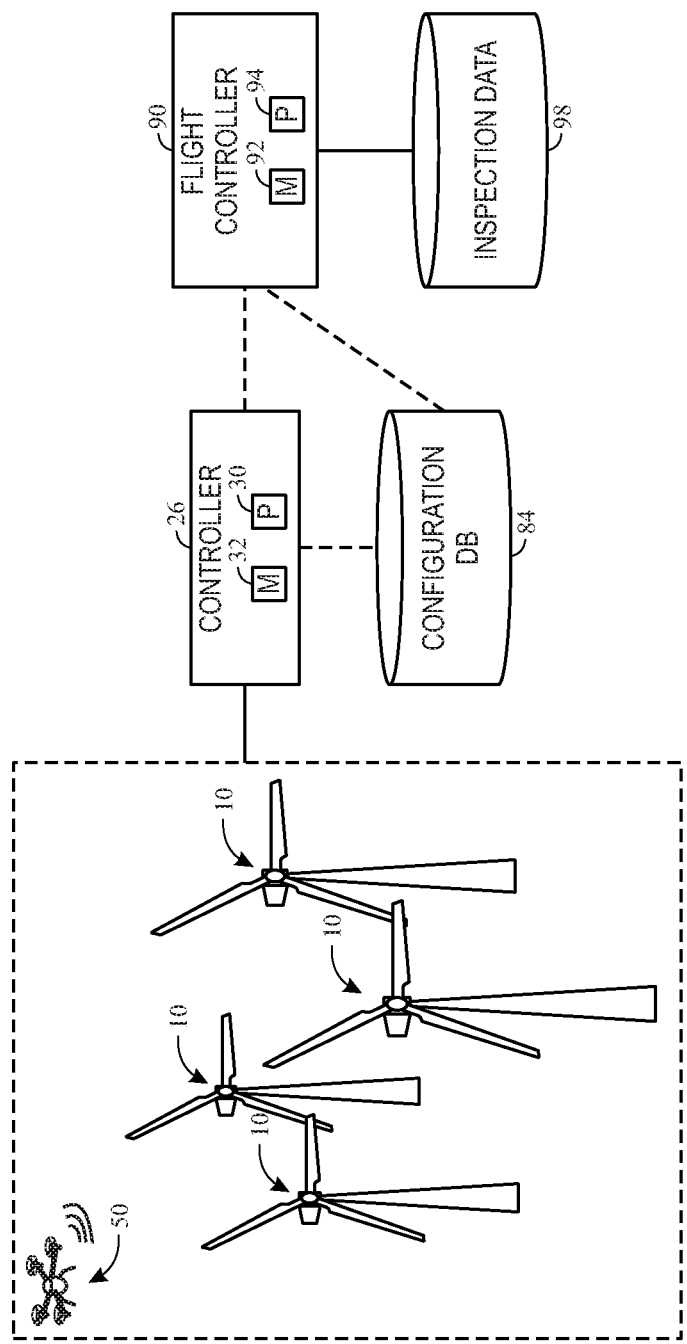
FIG. 2 is a block diagram of an embodiment of wind power system site having use of a drone-based inspection system, in accordance with aspects of the present disclosure.

Turning to FIG. 2, aspects of a system suitable for inspecting one or more assets, such as a multitude of wind turbine systems 10 provided as a wind farm 80, is described. In this example, the wind turbine generators 10 of the wind farm 80 are individually or collectively controlled or in communication with a controller 26, as previously described in the context of a single wind turbine generator 10.

By way of example, at the local site (i.e., wind farm 80), SCADA (supervisory control and data acquisition) protocols may be executed on the controller 26 (or as part of other circuit or processor implementations) as part of the ongoing operation and oversight of the wind farm 80. In such an implementation, the SCADA protocols or routines, when implemented, may acquire operational data from each of the wind turbine generators 10 of the farm 80 and may control operation of the individual wind turbine generators 10, such as by sending operation commands or instructions to the respective wind turbine generators 10.

To facilitate such operational monitoring and control by the SCADA routines, some or all of the wind turbine generators 10 may include sensors that may measure environmental conditions and/or weather data relevant to the wind turbine generator 10 (such as wind speed, wind direction, atmospheric pressure, temperature, humidity, precipitation over a time period, atmospheric conditions, and so forth). The sensors may additionally or alternatively measure parameters related to the operation of the respective wind turbine generator 10, such as blade revolutions per minute, temperature, vibration, torque, hours used, electrical power production, and so forth.

Thus the SCADA protocols associated with a given wind turbine generator or farm of wind turbine generators may be configured to determine one or more of an operating state, environmental or local conditions, and/or current operational parameters or characteristics for a given generator, such as a nacelle yaw, blade angles, operating state, and so forth for each generator. In addition, the SCADA protocols may be configured to generate and transmit commands or instructions to the wind turbine generators 10 of the associated farm 80. Examples of such commands include, but are not limited to, commands to start and stop blade movement (and corresponding power generation) and/or commands to assume known or specified configurations, such as a "rabbit ear" command (in which, for a three-blade turbine, one blade is pointed downward and the other two are angled upwards, such as at 30° angles relative to the surface).

In the depicted example, the controller 26, and possibly any SCADA routines executing on the controller 26, is in communication with a configuration database 84. Such a configuration database 84 may be used to store and/or manage various configuration data for the wind turbine generators 10 of a respective wind farm 80. For example, for each wind turbine generator 10, the configuration database may include model and/or serial numbers for one or more components, blade identifiers or numbers, color coding or visual markings associated with each blade, and so forth.

FIG. 2 also depicts a flight controller 90 that is responsible for coordinating operation of one or more drones 50, such as for inspection of the wind turbine generators 10 of the farm 80. In one embodiment, the drone(s) 50 have onboard cellular or network connectivity and can communicate with the flight controller 90 at least prior to beginning an inspection. In certain implementations the cellular or network connectivity of the drone(s) 50 allow communication during an inspection, allowing inspection data to be communicated to the flight controller 90 or other components (e.g., inspection data repository 98) and/or allowing the flight controller to communicate changes to the flight plan to a given drone 50.

In the depicted example, the flight controller is depicted as a processor-based system having a one or more processors 94 and a memory 92. For example, the processor 94 may execute routines stored in the memory 92 (and/or utilize data stored in the memory 92) to generate commands or flight plans for the drone(s) 50 used in an inspection process. In the depicted example, the flight controller 90 is in communication with one or both of the wind turbine controller 26 and/or the configuration database 84 and may use information obtained from either source in the control of the drone(s) 50. Conversely, based on information or feedback received from the drone(s) 50, the flight controller 90 may update or issue instructions to the wind turbine controller 26 and/or the configuration database. Thus, the flight controller 90 may in certain embodiments be characterized as being an interface between the drone(s) 50 and the SCADA protocols employed to operate and monitor the wind turbine generators 10 of the farm 80, as well as interfacing with the configuration database 84 where appropriate.

In addition, the flight controller 90 is depicted as in communication with an inspection data database 98, such as an image repository. By way of example, videos, images, LIDAR data, or other relevant sensor or camera data acquired by the one or more drones 50 during an inspection may be uploaded to the inspection data database 98 as acquired or as a batch after an inspection flight plan is completed. The data within the inspection data database may then be reviewed or validated as part of the inspection process. In certain implementations, acquired inspection data (e.g., sensors readings, video, still images) may be assessed in real time or near-real-time, in which case the flight controller 90 may on-the-fly update flight plan of a drone 50 if acquisition of additional inspection data is warranted (e.g., additional video or images from a different range or angle).

Inspection or image data may also include images of the turbine blades 16 that include a visual identifier (e.g., an alphanumeric code, two- or three-dimensional bar code and so forth) that can be used to match and identify a given blade undergoing inspection. By way of example, in one embodiment related to turbine blade inspection, which blade of a generator is being inspected (or has been inspected) is determined using optical character recognition (OCR) techniques and/or a combination of OCR techniques and paint matching or color coding techniques to analyze marking on the blades, such as near the roots of the blades. For example, using these techniques, blades may be matched using images acquired during an inspection compared to a stored repository of previously captured images. In this manner, during an inspection, a drone may be able to infer which blade of a wind turbine generator is which.

In the depicted example, the turbine controller 26, flight controller 90, configuration database 84, and inspection database 98 are depicted as separate and discrete entities. However, it should be appreciated that, depending on the implementation, certain of these aspects may be provided as different functions or functionalities implemented by a single or common processor-based system. Conversely, the depicted functionalities may be implemented in a distributed or dispersed manner, with certain aspects being local to the wind farm 80 (such as the SCADA or wind turbine controller 26) and other remote from the wind farm 80 (such as the inspection database 98. In such distributed implementations, the depicted aspects may still be communicatively linked, such as over one or more network connections.

Figure 3:
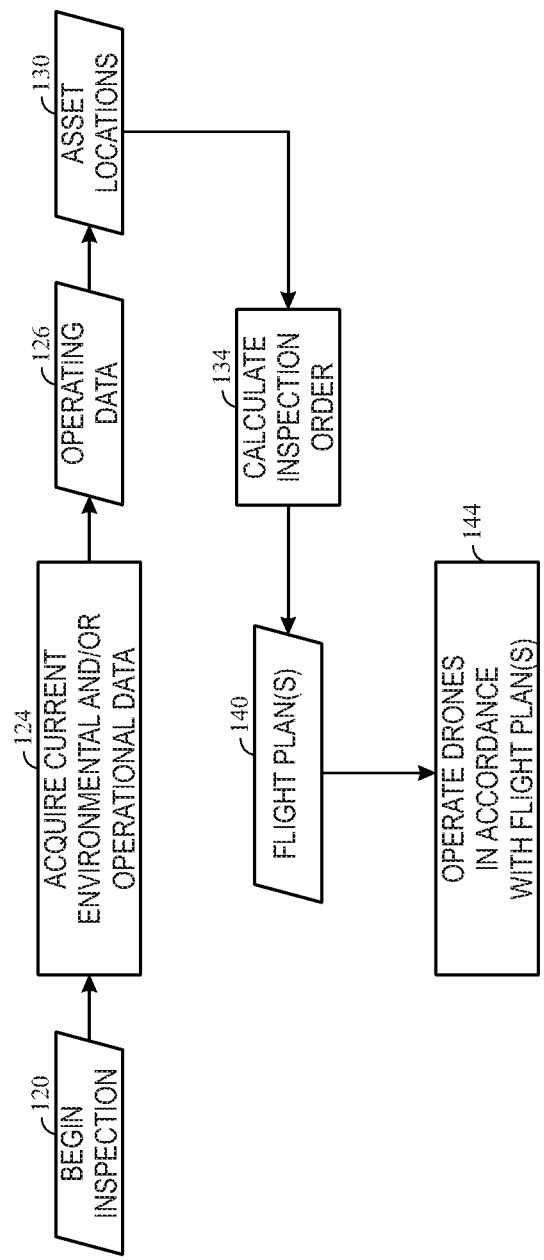
FIG. 3 depicts a process flow of an inspection initiation flow, in accordance with aspects of the present disclosure.

Turning to FIG. 3, an example of algorithm steps in the initiation of an inspection operation are depicted. Such steps may be implemented by a processor of a system or component discussed herein to begin the steps of an asset inspection process. In this example, an initial command 120 may be received to begin an inspection, such as by a user interacting with a user interface of the flight controller 90 or turbine controller 26 to issue an inspection command.

In the depicted example, in response to the inspection command 120, a step 124 is performed of acquiring environmental and/or operational data 126 for the asset or assets to be inspected. Such operating data 126 may include, but is not limited to, current weather or environmental conditions as well as data related to an operating state for the asset or assets undergoing inspection. In addition, location data 130 (e.g., latitude and longitude) for the asset or assets may be acquired either from the same source or from a separate data source.

In certain implementations, operating data 126, including weather or environmental data, may be processed or transformed into higher-level constructs which may be used in subsequent processes. By way of example, for a given location, such as a wind farm site, environmental data may be acquired at multiple locations so as to create a map or representation of localized conditions at different locations of the site. For instance, in the context of a wind farm, anemometers, wind vanes, and so forth may be used to acquire localized wind pattern data, which may vary for different locations within the wind farm. This localized wind pattern data may be represented as a map or other spatial representation which may be used to generate flight plans. Similarly, further processing of the localized environment data based on knowledge of the drones to be employed in an inspection may allow generation of certain types of maps or spatial representations, such as a yaw offset map, that may be useful in flight planning, as discussed in greater detail below.

Based on the operating data 126 and locations 130, an inspection order for the assets, if more than one is to be inspected, is calculated (block 134). From the inspection order, a flight plan 140 may be generated. The flight plan, as noted above, may consist of a series of waypoints to which the drone or drones 50 travel in a specified order and/or at specified times. As noted above, generation of the flight plan may take into account localized environmental conditions (e.g., wind speed and direction) and or estimated flight characteristics (e.g., yaw offset) in view of the localized environmental conditions and drone characteristics.

At certain of the waypoints on the flight plan 140, one or more cameras or sensors may be activated to acquire inspection data. As noted above, the flight plan (or waypoints of the flight plan) might also specify particular orientations to be exhibited by the drone(s) at given waypoints or while in motion between waypoints. The one or more drones may then be operated (block 144) in accordance with the inspection flight plan.

Figure 4:
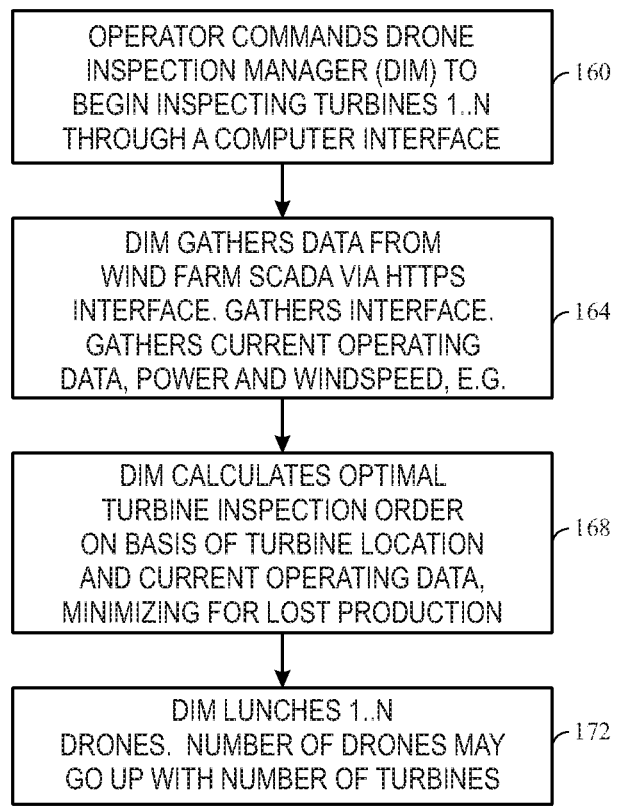
FIG. 4 depicts a process flow of a wind turbine generator inspection initiation flow, in accordance with aspects of the present disclosure.

While FIG. 3 represents a generalized flight plan generation algorithm, FIG. 4 relates steps of an algorithm corresponding to a real-world implementation, here the inspection of wind turbine generators. In this example, at step 160 the operator commands a drone inspection manager (DIM) computer-implemented routine or program to begin inspecting one or more wind turbine generators. In response to this instruction, the DIM program gathers (step 164) data from the respective wind farm SCADA via a communication (e.g., network) interface. In one implementation, the data gathered by the DIM from the SCADA includes, but is not limited to, current operating data, generated power, wind speed, and so forth. Based on the collected data, the DIM program calculates (step 168) a turbine inspection order based on turbine locations and current operating and/or environmental data. By way of example, the turbine inspection order may be calculated so as to minimize lost production (i.e., power generation). Based on the turbine inspection order, at step 172 the DIM program may launch one or more drones to inspect the wind generation turbines in the specified order.

Figure 5:
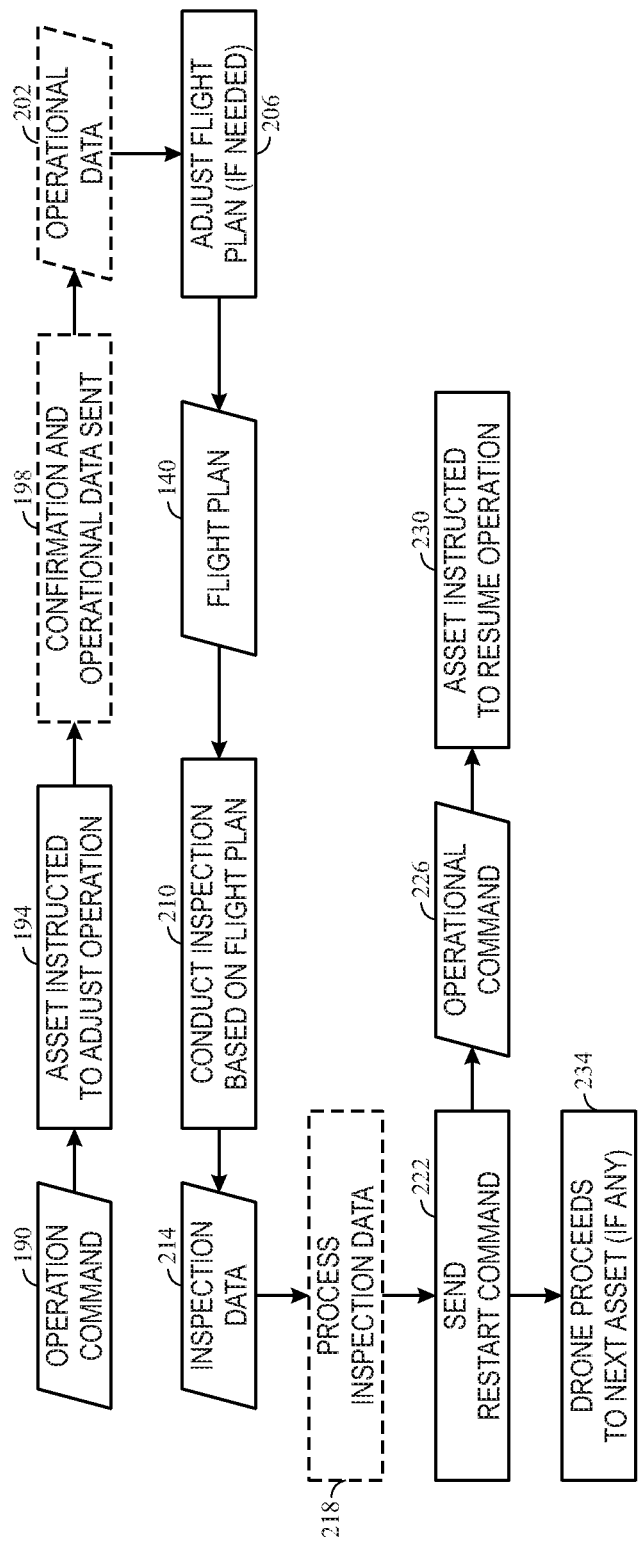
FIG. 5 depicts a process flow of an inspection flow, in accordance with aspects of the present disclosure.

Turning to FIG. 5, an example of algorithm steps in the execution of an inspection operation are depicted. Some or all of the steps may be implemented by a processor of a system or component discussed herein to perform an asset inspection process. In this example, the inspection process involves coordination of the operation of both the asset and the drone. For example, starting at step 190, as a drone 50 performing an inspection approaches an asset to be inspected, an operational command 190 may be issued to the asset to change (block 194) an aspect of its operation, such as to stop motion of some component that typically moves during operation. In the depicted example, the asset, or a controller in communication with the asset, may issue a confirmation (block 198) that the operational command 190 was executed and, in certain implementations, may provide current operational data 202 for the asset, such as the motion or operational state for various components, the position or orientation of components that may be mobile, the power state of the asset, localized environmental conditions (or flight characteristics, such as yaw offset, derived for the localized environmental conditions), and so forth. By way of example, local wind speed and direction, or localized yaw offsets derived for the local wind conditions, may be provided at this step.

Based on the operational command 190 being sent and/or on a confirmation or operational data 202 being received, a flight controller 90 in communication with the drone(s) 50 may make adjustments (block 206) to the flight plan 140 if justified and convey the modified flight plan 140 to the drone 50. Alternatively, in certain embodiments, certain onboard navigational capability may be provided on the drone 50 itself and, in response to receipt of operational data 202, flight plan adjustments may be made by processing components on the drone itself. By way of example, yaw offset for a given drone, location and sequence of way points, and so forth may be updated based on most recent or real-time wind data obtained at an inspection site. In one such example, wind data or a yaw offset map derived for such wind data may be monitored in real-time or near-real-time for changes and/or deviations from expected values and, in response to such changes or deviations (or in expectation of expected changes or deviations), a flight plan 140 may be modified on periodically or on-the-fly.

Based on the flight plan 140, the drone(s) 50 may conduct (block 210) an inspection executing the flight plan 140, i.e., by moving along the flight plan to the various waypoints under the temporal constraints specified and operating one or more cameras or sensors based on the flight plan 140. By moving along the flight plan as instructed and operating its sensors and/or cameras the drone generates a set of inspection data 214. In one embodiment, the inspection data 214 may be processed (block 218) in real time or near-real time, such as to determine the completeness of the inspection data 214 or to determine if the inspection data 214 indicates a potential problem for which additional data should be collected. In such scenarios, the flight plan 140 may be updated and the inspection resumed to collect whatever additional inspection data is needed. In other implementations, the inspection data 214 is not downloaded until the drone(s) 50 return to their base location, at which time the inspection data 214 may be processed or analyzed.

In the depicted example, after acquisition of the inspection data 214, a restart command 226 may be sent (block 222) to the asset, instructing it to resume (block 230) operation if some aspect of operation was stopped or modified for the inspection. In addition, if additional assets are to be inspected, the drone 50 may proceed (block 234) to the next asset, such as in accordance with the flight plan 140. In such a circumstance, the next asset to be inspected may be issued an operational command 190 to stop or modify its operation (block 194) once the drone(s) 50 approach the asset, beginning the process shown in FIG. 5 once again.

Figure 6:
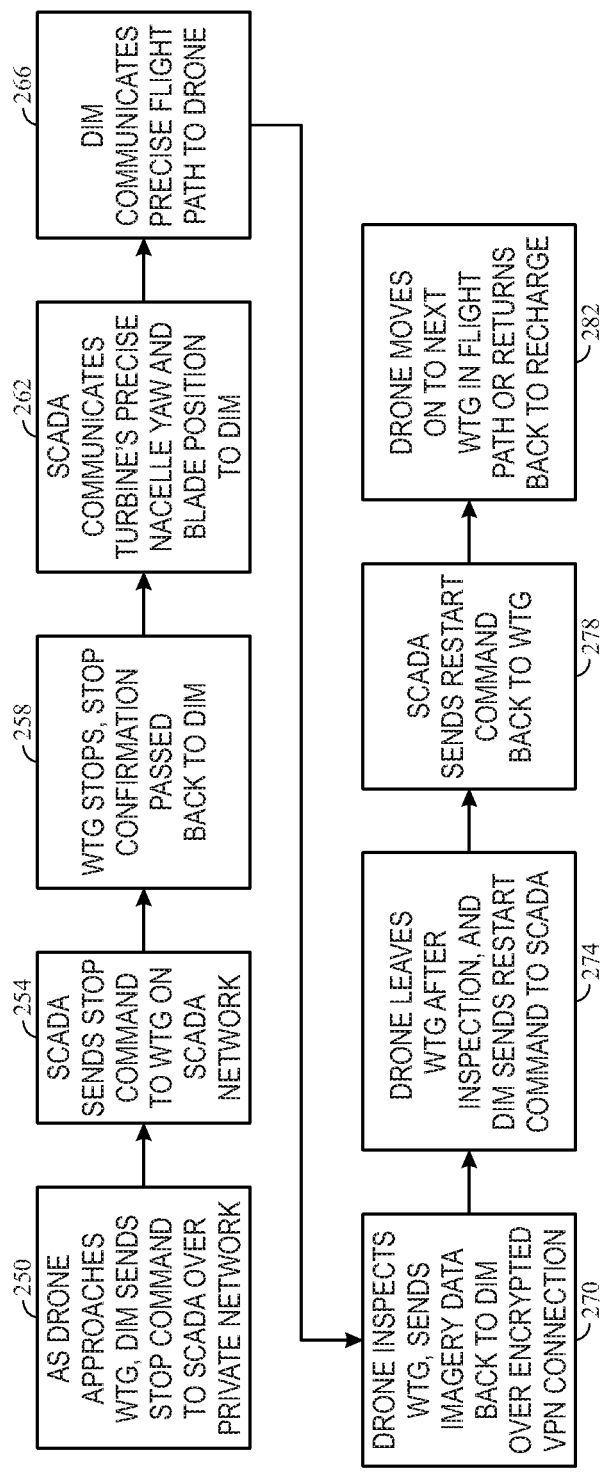
FIG. 6 depicts a process flow of a wind turbine generator inspection flow, in accordance with aspects of the present disclosure.

While FIG. 5 represents a generalized inspection process flow, FIG. 6 relates steps of a process flow corresponding to a real-world implementation, here the inspection of wind turbine generators. Unlike prior approaches, the present approach, as described below, integrates the SCADA operating data for a wind turbine generator to command or adjust operation of the turbines when an inspection drone approaches (e.g., mid-flight) on the basis of drone approach. In this example, at step 250 drone inspection manager (DIM) routines, such as may be implemented as part of a flight controller 90, send a stop command to a SCADA in communication with a wind turbine generator 10 to be inspected. In response, at step 254 the SCADA sends a stop command to the respective wind turbine generator 10. Upon receipt of the stop command, the wind turbine generator 10 stops (block 258) rotation of its blades, such as by going into a rabbit ear blade orientation, and sends a confirmation to the DIM ton confirm a stopped operational state. In the depicted example, once the wind turbine generator is stopped, the SCADA determines the nacelle yaw and blade position of the respective wind turbine generator and sends (block 262) this information to the DIM. Based on the operational data received from the SCADA, the DIM communicates (block 266) the flight plan to one or more drones 50 which will inspect the wind turbine generator. The drone(s) inspect (block 270) the wind turbine generator in accordance with the flight plan. In this example, the drone(s) 50 send imagery data back to the DIM, such as over an encrypted network connection.

Once the inspection is completed, the drone(s) 50 leave (block 274) the wind turbine generator and the DIM sends a restart command to the SCADA. In response to the restart command, the SCADA instructs the wind turbine generator to resume operation (block 278). If additional wind turbine generators are to be inspected, the drone(s) 50 move to the next inspection target (block 282) and the process is repeated. In all generators have been inspected, the drone(s) return to base.

Technical effects of the invention include a system that integrates operating data from a wind turbine (or other asset) to adjust a flight path or otherwise control a drone conducting an inspection. Based on the proximity of the drone and the status of the inspection, the operation of the asset (e.g., wind turbine) may also be adapted or adjusted, facilitating inspection of those parts of the asset that move during operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An asset inspection system, comprising:
   an asset controller configured to monitor one or more parameters associated with an asset and to control operation of the asset;
   one or more drones; and
   a flight controller configured to communicate with the one or more drones and the asset controller, wherein the flight controller is configured to:
      send a command to the asset controller instructing the asset controller to transition the asset from a first operational mode to a second operational mode;
      receive a confirmation from the asset controller that the asset has transitioned to the second operational mode; and
      instruct the one or more drones to execute a flight plan about the asset to collect inspection data of the asset while the asset is in the second operational mode.

2. The asset inspection system of claim 1, wherein the asset comprises a power generation asset, a pipeline, an electrical grid, or a vehicle.

3. The asset inspection system of claim 1, wherein the asset comprises a wind turbine generator.

4. The asset inspection system of claim 1, further comprising:
   a configuration database configured to store or manage configuration data for the asset.

5. The asset inspection system of claim 1, further comprising:

an inspection data repository configured to receive the inspection data generated by the one or more drones for the asset.

6. The asset inspection system of claim 1, wherein the asset controller is configured to stop operation of the asset when transitioning the asset from the first operational mode to the second operational mode.

7. The asset inspection system of claim 1, wherein the flight controller is configured to modify the flight plan based on information received from the asset controller.

8. The asset inspection system of claim 1, wherein the flight controller is configured to send an additional command to the asset controller instructing the asset controller to transition the asset from the second operational mode to the first operational mode upon a determination that the one or more drones have executed the flight plan.

9. The asset inspection system of claim 1, wherein the asset controller comprises a processor-based system executing one or more supervisory control and data acquisition (SCADA) protocols.

\* \* \* \* \*